(12) United States Patent
Paz et al.

(10) Patent No.: US 10,710,656 B2
(45) Date of Patent: Jul. 14, 2020

(54) WINDSHIELD ASSEMBLY SYSTEM

(71) Applicant: GM Global Technology Operations LLC, Detroit, MI (US)

(72) Inventors: Guilherme Paz, Rio Grande do Sul (BR); Cristian E. Silveira, Rio Grande do Sul (BR); Claonir Oliveira de Souza, Sapucaia do sul (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 387 days.

(21) Appl. No.: 15/586,677

(22) Filed: May 4, 2017

(65) Prior Publication Data

US 2018/0319453 A1    Nov. 8, 2018

(51) Int. Cl.
| | |
|---|---|
| *B62D 65/06* | (2006.01) |
| *B62D 65/02* | (2006.01) |
| *B23P 19/033* | (2006.01) |
| *B60J 1/00* | (2006.01) |
| *B25B 11/00* | (2006.01) |

(52) U.S. Cl.
CPC ............ *B62D 65/06* (2013.01); *B23P 19/033* (2013.01); *B25B 11/005* (2013.01); *B60J 1/005* (2013.01); *B62D 65/02* (2013.01); *B23P 2700/50* (2013.01)

(58) Field of Classification Search
CPC ....... B62D 65/06; B62D 65/02; B25B 11/005; B60J 1/005; B23P 19/033; B23P 2700/50
See application file for complete search history.

(56) References Cited

U.S. PATENT DOCUMENTS

| | | | | |
|---|---|---|---|---|
| 4,796,930 A | * | 1/1989 | Baynes | ................. E05B 63/244 292/341.15 |
| 5,208,966 A | * | 5/1993 | Noguchi | ............... B23P 21/004 29/281.1 |
| 8,894,126 B2 | | 11/2014 | Shope | |
| 2012/0102711 A1 | * | 5/2012 | Ali | .......................... B23P 19/10 29/429 |
| 2013/0167350 A1 | * | 7/2013 | Kokubo | ................. B23Q 3/088 29/426.5 |
| 2013/0305507 A1 | | 11/2013 | Finck et al. | |

FOREIGN PATENT DOCUMENTS

DE         212006000058 U1    9/2008

* cited by examiner

*Primary Examiner* — Lee A Holly

(57) ABSTRACT

An apparatus for installing a windshield on a motor vehicle includes a base, a handler, one or more spring assemblies positioned between the base and the handler, the one or more spring assemblies connected to the base and coupled to the handler to allow the handler to float relative to the base, a vibrator attached to the base, and one or more stoppers attached to the base, the one or more stoppers configured for placement between the base and the windshield for transmission of vibration generated by the vibrator to the windshield while the one or more spring assemblies minimizes the transmission of vibration from the base to the handler.

16 Claims, 4 Drawing Sheets

WINDSHIELD ASSEMBLY SYSTEM

INTRODUCTION

The present disclosure relates to a windshield assembly system. More specifically, the present disclosure relates to a windshield assembly system with a vibration base.

Motor vehicles are typically equipped with a windshield to provide protection for occupants of the motor vehicle form wind and debris. The windshields are generally transparent and are mounted to a supporting frame on the body of the motor vehicle such that the windshield is an integral part of the cabin that surrounds the occupants.

During a typical manufacturing process of a motor vehicle, the windshield is secured to a handler that an operator on the manufacturing line holds or grabs. The operator maneuvers the handler to position the windshield on the supporting frame on the motor vehicle body. The operator may then bang the windshield to seat the windshield on the supporting frame. After the windshield is seated, the handler is released from the windshield.

Although current windshield assembly systems achieve their intended purpose, there is a need for a new and improved system and method for assembling windshields on motor vehicles that minimize or reduce, for example, potential ergonomic issues during the manufacturing process.

SUMMARY

According to several aspects, an apparatus for installing a windshield on a motor vehicle includes a base, a handler, one or more spring assemblies positioned between the base and the handler, the one or more spring assemblies connected to the base and coupled to the handler to allow the handler to float relative to the base, a vibrator attached to the base, and one or more stoppers attached to the base, the one or more stoppers configured for placement between the base and the windshield for transmission of vibration generated by the vibrator to the windshield while the one or more spring assemblies minimizes the transmission of vibration from the base to the handler.

In an additional aspect of the present disclosure, each of the one or more spring assemblies includes a bolt threaded into the base and a spring positioned about the bolt and between the handler and the base.

In another aspect of the present disclosure, the vibrator generates a vibration frequency of about 40 cycles/sec.

In another aspect of the present disclosure, the vibrator generates a maximum force imparted on the windshield of about 150 Newtons.

In another aspect of the present disclosure, the one or more spring assemblies are four spring assemblies.

In another aspect of the present disclosure, the one or more stoppers are eight stoppers.

In another aspect of the present disclosure, the one or more stoppers are made of rubber.

In another aspect of the present disclosure, the apparatus further includes a pneumatic system with one or more suction cups configured for placement between the base and the windshield, wherein the pneumatic system generates a vacuum between the one or more suction cups and the windshield to attach the windshield to the base for a predetermined time.

In another aspect of the present disclosure, the one or more suction cups are four suction cups.

According to several aspects, an apparatus for installing a windshield on a motor vehicle includes a base, a handler, one or more spring assemblies positioned between the base and the handler, the one or more spring assemblies connected to the base and coupled to the handler to allow the handler to float relative to the base, a vibrator attached to the base, one or more stoppers attached to the base, the one or more stoppers configured for placement between the base and the windshield for transmission of vibration generated by the vibrator to the windshield, the one or more spring assemblies minimizing the transmission of vibration from the base to the handler, and a pneumatic system with one or more suction cups configured for placement between the base and the windshield, wherein the pneumatic system generates a vacuum between the one or more suction cups and the windshield to attach the windshield to the base for a predetermined time.

In an additional aspect of the present disclosure, each of the one or more spring assemblies includes a bolt threaded into the base and a spring positioned about the bolt and between the handler and the base.

In another aspect of the present disclosure, the vibrator generates a vibration frequency of about 40 cycles/sec.

In another aspect of the present disclosure, the vibrator generates a maximum force imparted on the windshield of about 150 Newtons.

In another aspect of the present disclosure, the one or more spring assemblies are four spring assemblies.

In another aspect of the present disclosure, the one or more stoppers are eight stoppers.

In another aspect of the present disclosure, the one or more stoppers are made of rubber.

According to several aspects, a method of installing a windshield on a motor vehicle includes applying a vacuum between one or more suction cups and the windshield with a pneumatic system, the one or more suction cups between positioned between a base and the windshield; placing the windshield on the motor vehicle with a handler coupled to the base with one or more spring assemblies, the one or more spring assemblies being connected to the base and coupled to the handler to allow the handler to float relative to the base; generating a vibration with a vibrator attached to the base, the vibration being transmitted from the base to the windshield through one or more stoppers positioned between the base and the windshield, the one or more spring assemblies minimizing the transmission of vibration from the base to the handler; and turning off the vacuum to release the windshield from the base.

In an additional aspect of the present disclosure, each of the one or more spring assemblies includes a bolt threaded into the base and a spring positioned about the bolt and between the handler and the base.

In another aspect of the present disclosure, the vibrator generates a vibration frequency of about 40 cycles/sec.

In another aspect of the present disclosure, the vibrator generates a maximum force imparted on the windshield of about 150 Newtons.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
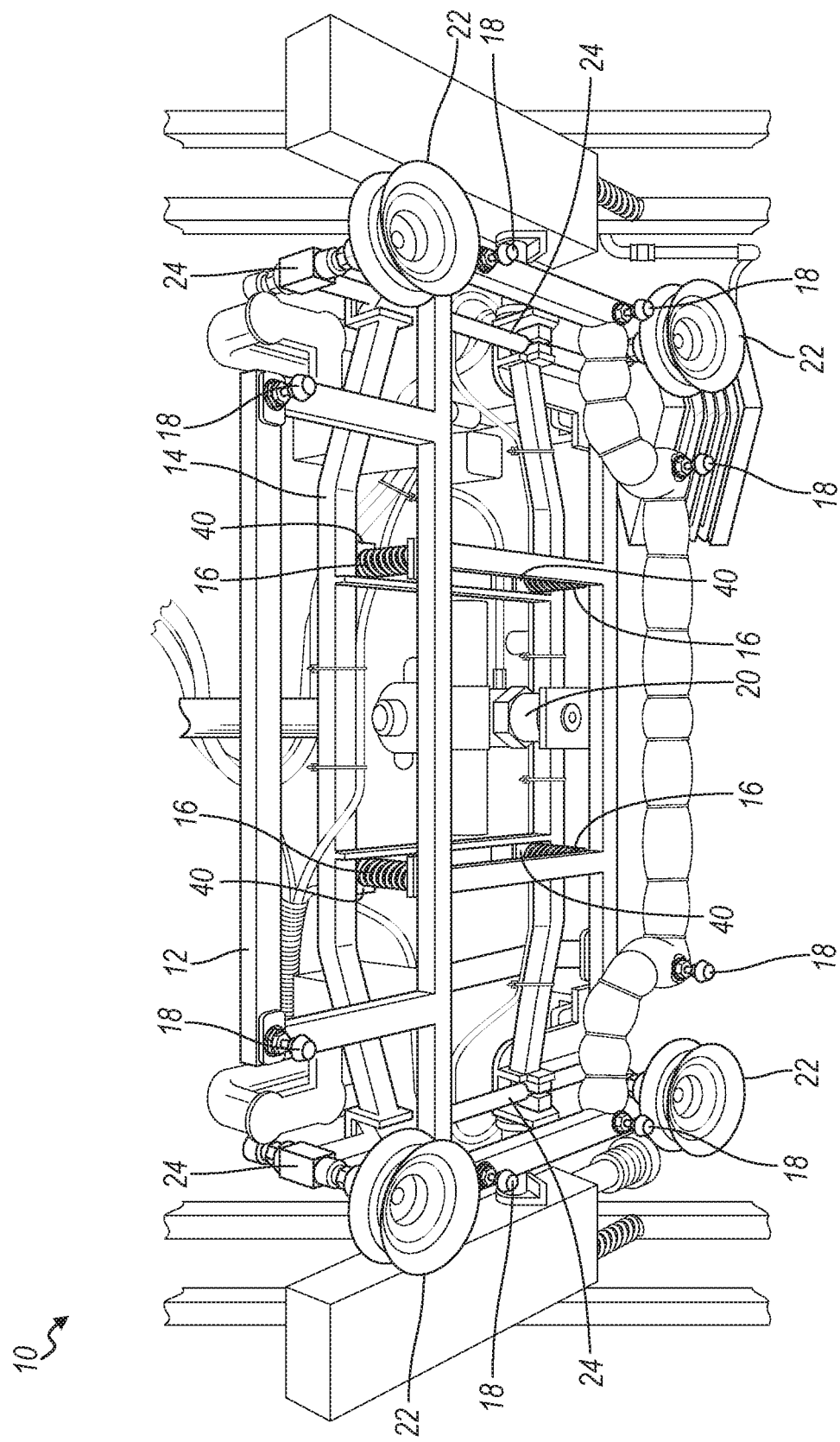
FIG. 1 shows a windshield assembly system in accordance with the principles of the present invention.

Referring now to FIG. 1, a windshield assembly system is illustrated therein and designated as 10. The windshield assembly system 10 utilizes a vibration mechanism to seat a windshield on a supporting frame of a body of a motor vehicle during the manufacturing process of the motor vehicle while minimizing the transmission of the vibration to an operator handling the windshield assembly system 10.

Figure 2:
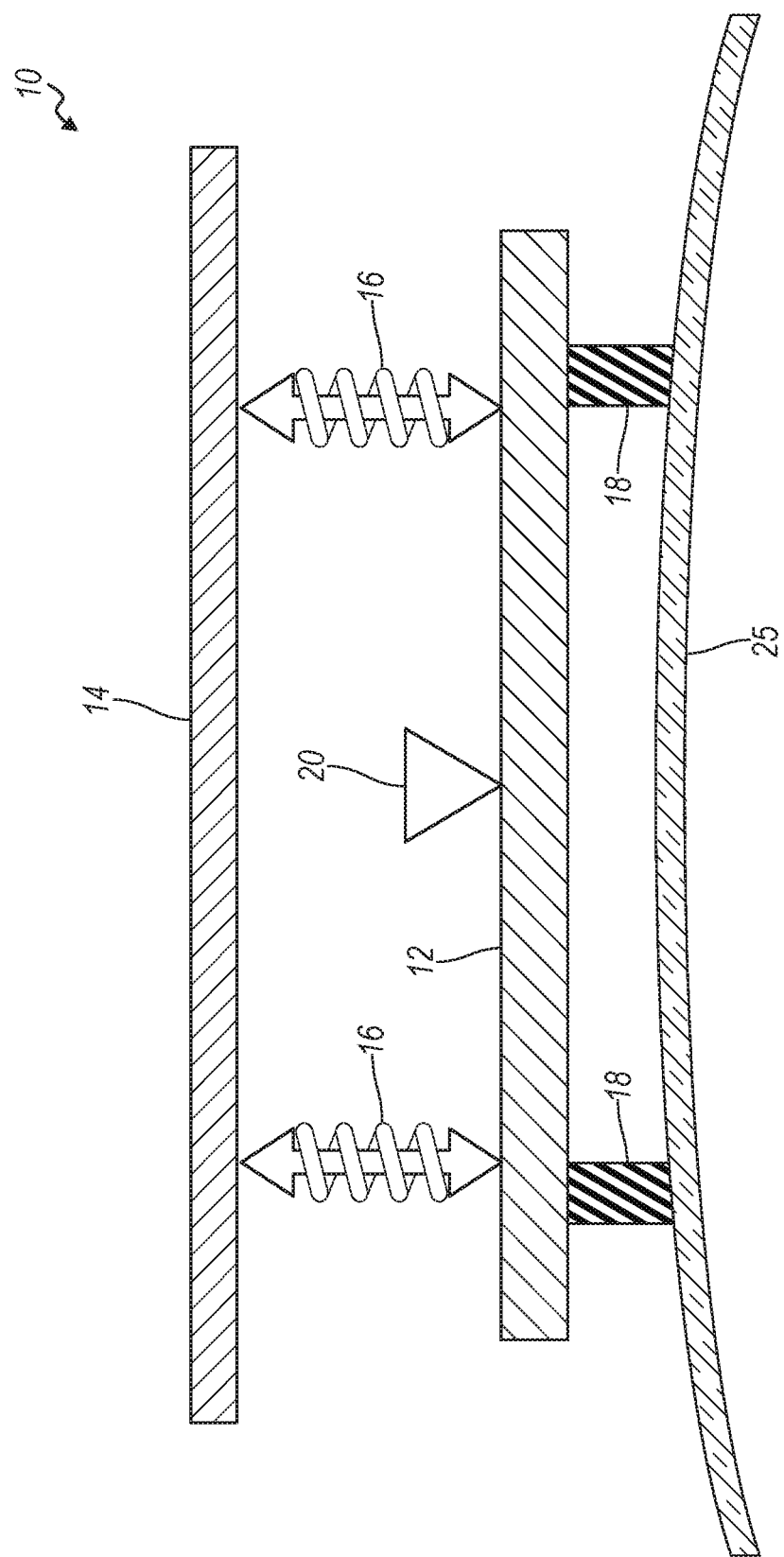
FIG. 2 is a schematic diagram of the windshield assembly system.

In various configurations, the windshield assembly system 10 includes a base 12 coupled to a handler 14 with a set of spring assemblies 16. A set of stoppers 18 are attached to the bottom of the base 12. In the configuration shown in FIG. 1, the set of stoppers 18 includes eight stoppers. The stoppers are made of rubber or any other suitable elastomeric material. In certain configurations, the set of stoppers 18 includes more than eight stoppers, but in other configurations the set of stoppers 18 includes less than eight stoppers. Also attached to the base 12 is a vibrator 20 driven by a pneumatic system 100 (FIG. 4) described below. In a particular configuration, the vibrator 20 is pressurized with a pressure of about 6 bar to generate a desired vibration that is transmitted through the set of stoppers 18 to a windshield 25 (FIG. 2) that is placed on the supporting frame of the body of the motor vehicle. In various configurations, the vibrator 20 generates a vibration with a frequency of about 40 cycles/sec and imparts a force on the windshield of about 150 Newtons.

The aforementioned pneumatic system 100 includes a set of suction cups 22 attached to the bottom of the handler 14. The suction cups 22 are connected to a vacuum pump by a set of lines 24. When the suction cups 22 are placed on the windshield 25 and a vacuum is created between the suction cups 22 and the windshield 25 to secure the windshield 25 to the windshield assembly system 10, the operator is able to maneuver the windshield assembly system 10 to properly place the windshield 25 on the supporting frame of the body of the motor vehicle. After the windshield 25 is in place, the vibrator 20 is activated to properly seat the windshield in the supporting frame. After being seated, the suction is removed such that the windshield assembly system 10 can be employed to place a windshield on the next motor vehicle body in the manufacturing process.

Figure 3:
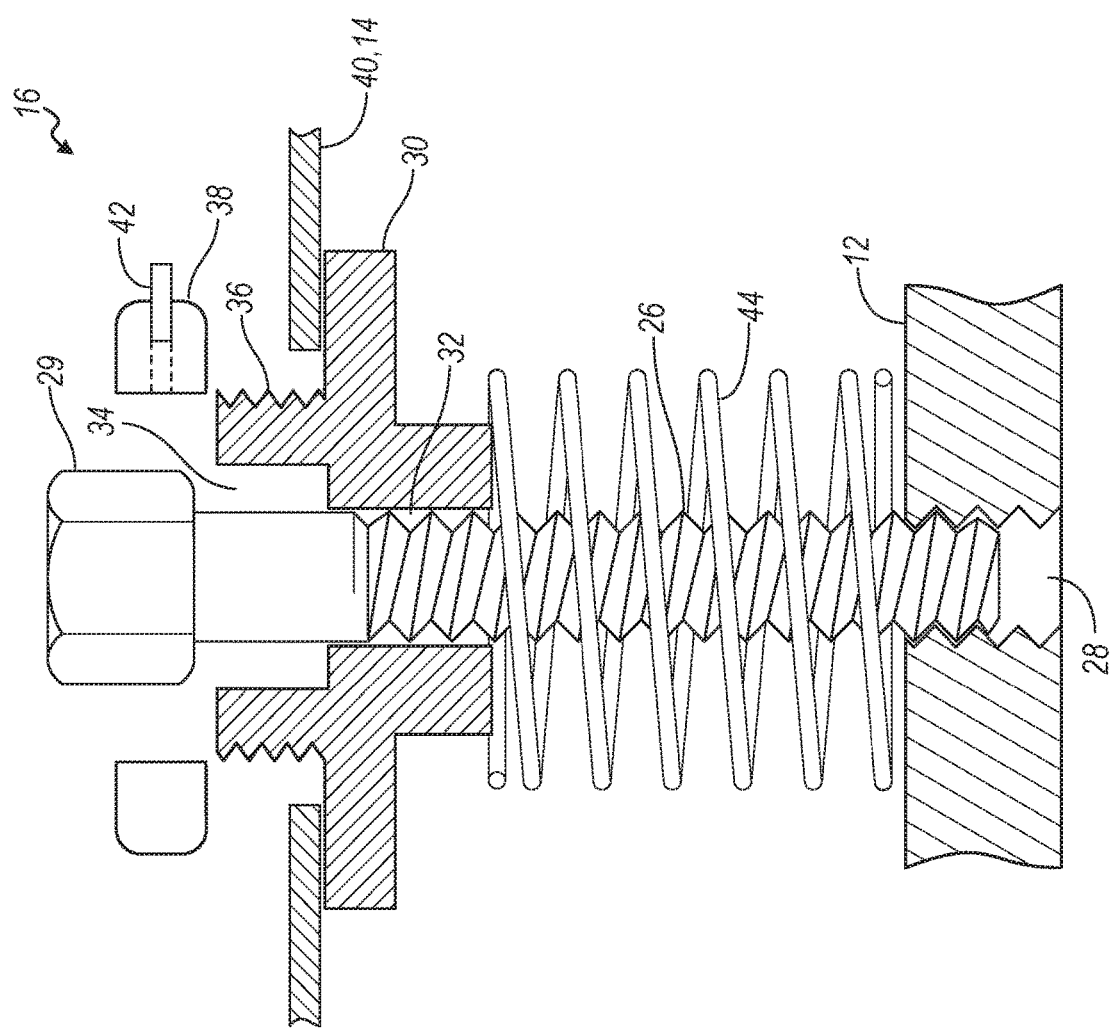
FIG. 3 is a partial cut-away view of a spring system for the windshield assembly system in accordance with the principles of the present invention.

The set of spring assemblies 16 are utilized to reduce and minimize vibrations delivered to the person operating the windshield assembly system 10 as the windshield assembly system is being maneuvered and when the vibrator 20 is activated. Referring to FIG. 3, there is shown a detailed schematic view of a single spring assembly 16. The spring assembly 16 includes a bolt 26 with a threaded section 27 that threads into a threaded bore 28 of the base 12 to secure the bolt 26 to the base 12. The spring assembly 16 also includes a collar 30 with a narrow bore region 32 and a wide bore region 34. The narrow bore region 32 is wide enough to enable the bolt 26 to reciprocate within the narrow bore region 32. The collar 30 further includes a threaded section 36 that is sized to enable a nut 38 to be placed about the threaded section 36. A flanged portion 40 of the handler 14 is positioned between the nut 38 and the collar 30. A locking pin 42 is threaded inwardly into the nut 38 such that the locking pin 42 engages with the threaded section 36 to secure the nut 38 to the collar 30, thereby coupling the spring assembly 16 to the handler 14 via the flange 40. The bolt 26 also includes an enlarged head 29 that fits within the wide bore region 34. The enlarged head 29, however, is larger than the narrow bore region 32 to prevent the enlarged head from entering into the narrow bore region 32. A biasing member, such as a coiled spring 44, is positioned between the base 12 and the collar 30. As such, the coiled spring 44 imparts a force that urges the base 12 and the handler 14 away from each other. When a downward force is applied to the handler 14, the collar 30 moves downward to compress the coiled spring 44 while the base 12 and the bolt 26 remain stationary relative to the base 12. Hence, the spring assembly 16 enables the handler 14 to float relative to the base 12. Accordingly, the transmission of impacts and vibrations transmitted back to the operator are reduced during the manufacturing process. In particular, as vibrations created by the vibrator 20 are utilized to seat the windshield on the supporting frame of the body of the motor vehicle, the transmission of these same vibrations back to the handler 14, and hence to the operator, are minimized by the utilization of the spring assemblies 16.

Figure 4:
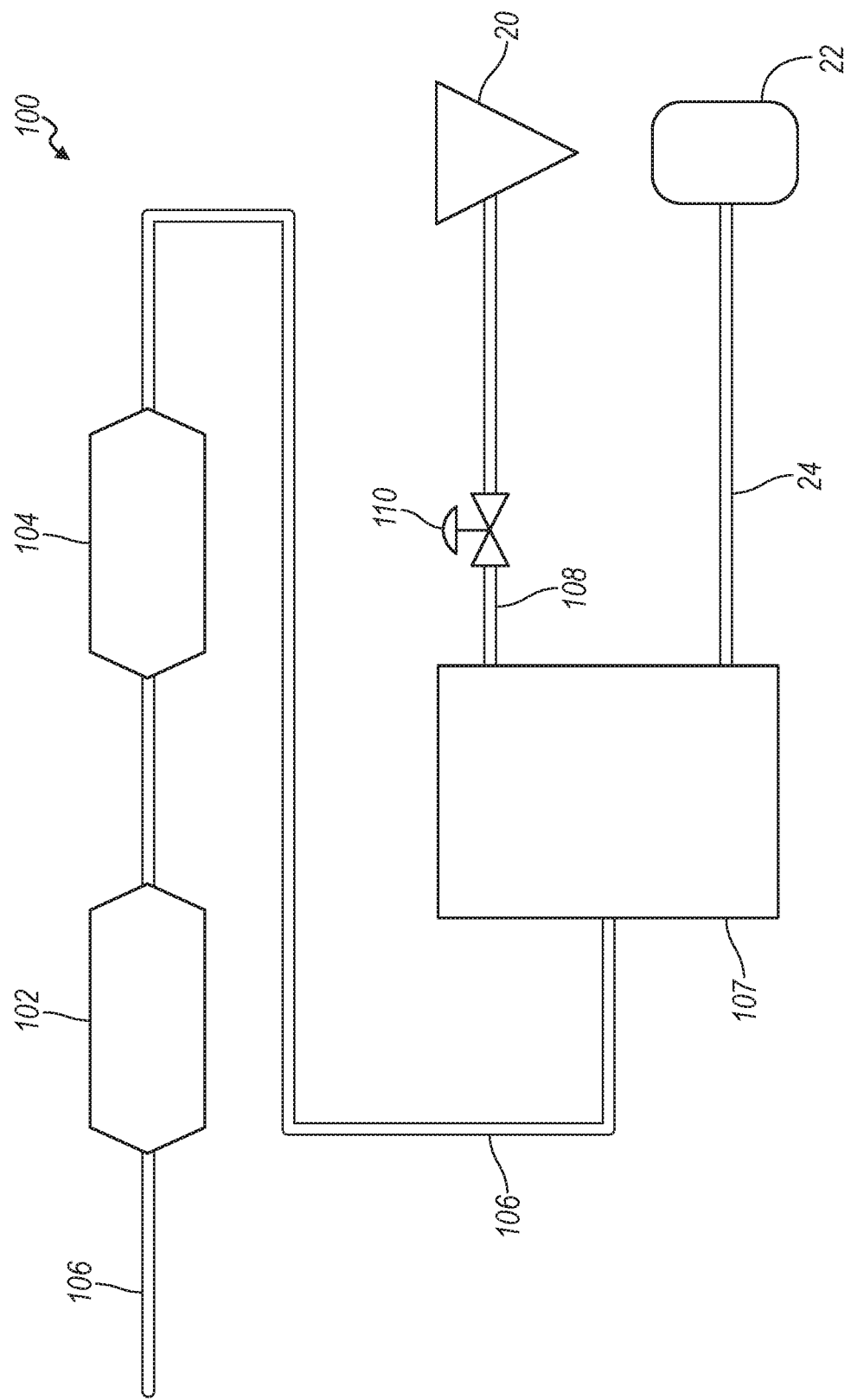
FIG. 4 is a schematic diagram of a pneumatic system for the windshield system in accordance with the principles of the present invention.

Referring now to FIG. 4, there is shown further details of the pneumatic system 100 described earlier. The pneumatic system 100 includes a line 106 that connects the aforementioned vacuum pump to a relay 107. The relay 107 is connected to the vibrator 20 with a line 108. A pressure regulator valve 110 is placed in the line 108 to control the operation of the vibrator 20. The relay 107 is also connected to the set of suction cups 22 with the set of lines 24.

During the operation of placing and installing a windshield 25 on the supporting frame motor vehicle body, a vacuum is created by the vacuum pump to create suction between the suction cups 22 and the windshield 25. The operator then maneuvers the handler 14 to place the windshield 25 onto the supporting frame of the motor vehicle body. After placement of the windshield 25, the relay 107 is set to activate the vibrator 20 through the line 108 for about five seconds at a frequency of about 40 cycles/sec and imparting force of about 150 Newtons under the control of the regulator valve 110. After about five seconds, the vibrator 20 is turned off and a set of extraction buttons 102 and 104 are pressed to eliminate the vacuum applied to the windshield by the suction cups 22 via the lines 24 to enable the extraction of the windshield assembly system 10 from the windshield 25. After the extraction of the windshield assembly system 10, the windshield assembly system is utilized for the placement of a windshield on the next motor vehicle body in the manufacturing process.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An apparatus for installing a windshield on a motor vehicle comprising:

a base;

a handler;
one or more spring assemblies positioned between the base and the handler, the one or more spring assemblies connected to the base and coupled to the handler to allow the handler to float relative to the base;
a vibrator attached to the base for transmission of vibration to the windshield; and
one or more stoppers attached to the base, the one or more stoppers disposed between the base and the windshield, the one or more stoppers being in contact with the windshield only when vibration is generated by the vibrator,
wherein the one or more spring assemblies minimizes the transmission of vibration from the base to the handler.

2. The apparatus of claim 1 wherein the vibrator generates a vibration frequency of about 40 cycles/sec.

3. The apparatus of claim 2 wherein the vibrator generates a maximum force imparted on the windshield of about 150 Newtons.

4. The apparatus of claim 1 further comprising a pneumatic system with one or more suction cups configured for placement between the base and the windshield, wherein the pneumatic system generates a vacuum between the one or more suction cups and the windshield to attach the windshield to the base for a predetermined time.

5. The apparatus of claim 4 wherein the one or more suction cups are four suction cups.

6. The apparatus of claim 1 wherein each of the one or more spring assemblies includes a bolt threaded into the base and a spring positioned about the bolt and between the handler and the base.

7. The apparatus of claim 1 wherein the one or more spring assemblies are four spring assemblies.

8. The apparatus of claim 1 wherein the one or more stoppers are eight stoppers.

9. The apparatus of claim 1 wherein the one or more stoppers are made of rubber.

10. An apparatus for installing a windshield on a motor vehicle comprising:
a base;
a handler;
one or more spring assemblies positioned between the base and the handler, the one or more spring assemblies connected to the base and coupled to the handler to allow the handler to float relative to the base;
a vibrator attached to the base for transmission of vibration to the windshield;
one or more stoppers attached to the base, the one or more stoppers disposed between the base and the windshield, the one or more stoppers being in contact with the windshield only when vibration is generated by the vibrator, the one or more spring assemblies minimizing the transmission of vibration from the base to the handler; and
a pneumatic system with one or more suction cups configured for placement between the base and the windshield, wherein the pneumatic system generates a vacuum between the one or more suction cups and the windshield to attach the windshield to the base for a predetermined time.

11. The apparatus of claim 10 wherein the vibrator generates a vibration frequency of about 40 cycles/sec.

12. The apparatus of claim 11 wherein the vibrator generates a maximum force imparted on the windshield of about 150 Newtons.

13. The apparatus of claim 10 wherein each of the one or more spring assemblies includes a bolt threaded into the base and a spring positioned about the bolt and between the handler and the base.

14. The apparatus of claim 10 wherein the one or more spring assemblies are four spring assemblies.

15. The apparatus of claim 10 wherein the one or more stoppers are eight stoppers.

16. The apparatus of claim 10 wherein the one or more stoppers are made of rubber.

\* \* \* \* \*